(12) United States Patent
Liu et al.

(10) Patent No.: US 12,164,296 B2
(45) Date of Patent: Dec. 10, 2024

(54) AUTONOMOUS VEHICLE SIMULATION SYSTEM FOR ANALYZING MOTION PLANNERS

(71) Applicant: TUSIMPLE, INC., San Diego, CA (US)

(72) Inventors: Liu Liu, San Diego, CA (US); Yuwei Wang, San Diego, CA (US); Xing Sun, San Diego, CA (US); Yufei Zhao, San Diego, CA (US); Wutu Lin, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

(21) Appl. No.: 18/364,587

(22) Filed: Aug. 3, 2023

(65) Prior Publication Data
US 2023/0376037 A1    Nov. 23, 2023

Related U.S. Application Data

(63) Continuation of application No. 17/126,740, filed on Dec. 18, 2020, now Pat. No. 11,782,440, which is a
(Continued)

(51) Int. Cl.
*G05D 1/00*    (2024.01)
*G06F 30/15*   (2020.01)
(Continued)

(52) U.S. Cl.
CPC ......... *G05D 1/0088* (2013.01); *G05D 1/0212* (2013.01); *G05D 1/0287* (2013.01);
(Continued)

(58) Field of Classification Search
CPC .. G05D 1/0088; G05D 1/0212; G05D 1/0287; G05D 2201/0213; G06F 30/15;
(Continued)

(56) References Cited

U.S. PATENT DOCUMENTS

| | | |
|---|---|---|
| 6,777,904 B1 | 8/2004 | Degner |
| 7,103,460 B1 | 9/2006 | Breed |

(Continued)

FOREIGN PATENT DOCUMENTS

| | | |
|---|---|---|
| CN | 105264450 A | 1/2016 |
| EP | 1754179 A1 | 2/2007 |

(Continued)

OTHER PUBLICATIONS

Hou, Xiaodi and Zhang. Liqing, "Saliency Detection: a Spectral Residual Approach", Computer Vision and Pattern Recognition, CVPR'07—IEEE Conference, pp. 1-8, 2007.
(Continued)

*Primary Examiner* — Thomas Ingram
(74) *Attorney, Agent, or Firm* — Perkins Coie LLP

(57) ABSTRACT

An autonomous vehicle simulation system for analyzing motion planners is disclosed. A particular embodiment includes: receiving map data corresponding to a real world driving environment; obtaining perception data and configuration data including pre-defined parameters and executables defining a specific driving behavior for each of a plurality of simulated dynamic vehicles; generating simulated perception data for each of the plurality of simulated dynamic vehicles based on the map data, the perception data, and the configuration data; receiving vehicle control messages from an autonomous vehicle control system; and simulating the operation and behavior of a real world autonomous vehicle based on the vehicle control messages received from the autonomous vehicle control system.

20 Claims, 8 Drawing Sheets

Related U.S. Application Data continuation of application No. 15/827,452, filed on Nov. 30, 2017, now Pat. No. 10,877,476.

(51) Int. Cl.
  *G06F 30/20* (2020.01)
  *G06F 111/10* (2020.01)

(52) U.S. Cl.
  CPC .............. *G06F 30/15* (2020.01); *G06F 30/20* (2020.01); *G06F 2111/10* (2020.01)

(58) Field of Classification Search
  CPC .. G06F 30/20; G06F 2111/10; G06F 11/3664; G06F 11/3668; G05B 17/02
  See application file for complete search history.

(56) References Cited

U.S. PATENT DOCUMENTS

| | | | |
|---|---|---|---|
| 7,689,559 B2 | 3/2010 | Canright | |
| 7,783,403 B2 | 8/2010 | Breed | |
| 7,844,595 B2 | 11/2010 | Canright | |
| 8,041,111 B1 | 10/2011 | Wilensky | |
| 8,064,643 B2 | 11/2011 | Stein | |
| 8,082,101 B2 | 12/2011 | Stein | |
| 8,164,628 B2 | 4/2012 | Stein | |
| 8,175,376 B2 | 5/2012 | Marchesotti | |
| 8,271,871 B2 | 9/2012 | Marchesotti | |
| 8,378,851 B2 | 2/2013 | Stein | |
| 8,392,117 B2 | 3/2013 | Dolgov | |
| 8,401,292 B2 | 3/2013 | Park | |
| 8,412,449 B2 | 4/2013 | Trepagnier | |
| 8,478,072 B2 | 7/2013 | Aisaka | |
| 8,553,088 B2 | 10/2013 | Stein | |
| 8,788,134 B1 | 7/2014 | Litkouhi | |
| 8,908,041 B2 | 12/2014 | Stein | |
| 8,917,169 B2 | 12/2014 | Schofield | |
| 8,963,913 B2 | 2/2015 | Baek | |
| 8,965,621 B1 | 2/2015 | Urmson | |
| 8,981,966 B2 | 3/2015 | Stein | |
| 8,993,951 B2 | 3/2015 | Schofield | |
| 9,002,632 B1 | 4/2015 | Emigh | |
| 9,008,369 B2 | 4/2015 | Schofield | |
| 9,025,880 B2 | 5/2015 | Perazzi | |
| 9,042,648 B2 | 5/2015 | Wang | |
| 9,111,444 B2 | 8/2015 | Kaganovich | |
| 9,117,133 B2 | 8/2015 | Barnes | |
| 9,118,816 B2 | 8/2015 | Stein | |
| 9,120,485 B1 | 9/2015 | Dolgov | |
| 9,122,954 B2 | 9/2015 | Srebnik | |
| 9,134,402 B2 | 9/2015 | Sebastian | |
| 9,145,116 B2 | 9/2015 | Clarke | |
| 9,147,255 B1 | 9/2015 | Zhang | |
| 9,156,473 B2 | 10/2015 | Clarke | |
| 9,176,006 B2 | 11/2015 | Stein | |
| 9,179,072 B2 | 11/2015 | Stein | |
| 9,183,447 B1 | 11/2015 | Gdalyahu | |
| 9,185,360 B2 | 11/2015 | Stein | |
| 9,191,634 B2 | 11/2015 | Schofield | |
| 9,233,659 B2 | 1/2016 | Rosenbaum | |
| 9,233,688 B2 | 1/2016 | Clarke | |
| 9,248,832 B2 | 2/2016 | Huberman | |
| 9,248,835 B2 | 2/2016 | Tanzmeister | |
| 9,251,708 B2 | 2/2016 | Rosenbaum | |
| 9,277,132 B2 | 3/2016 | Berberian | |
| 9,280,711 B2 | 3/2016 | Stein | |
| 9,286,522 B2 | 3/2016 | Stein | |
| 9,297,641 B2 | 3/2016 | Stein | |
| 9,299,004 B2 | 3/2016 | Lin | |
| 9,315,192 B1 | 4/2016 | Zhu | |
| 9,317,033 B2 | 4/2016 | Ibanez-Guzman | |
| 9,317,776 B1 | 4/2016 | Honda | |
| 9,330,334 B2 | 5/2016 | Lin | |
| 9,342,074 B2 | 5/2016 | Dolgov | |
| 9,355,635 B2 | 5/2016 | Gao | |
| 9,365,214 B2 | 6/2016 | Ben Shalom | |
| 9,381,916 B1 | 7/2016 | Zhu | |
| 9,396,667 B1 | 7/2016 | Bober | |
| 9,399,397 B2 | 7/2016 | Mizutani | |
| 9,428,192 B2 | 8/2016 | Schofield | |
| 9,436,880 B2 | 9/2016 | Bos | |
| 9,438,878 B2 | 9/2016 | Niebla | |
| 9,443,163 B2 | 9/2016 | Springer | |
| 9,446,765 B2 | 9/2016 | Ben Shalom | |
| 9,459,515 B2 | 10/2016 | Stein | |
| 9,466,006 B2 | 10/2016 | Duan | |
| 9,476,970 B1 | 10/2016 | Fairfield | |
| 9,490,064 B2 | 11/2016 | Hirosawa | |
| 9,531,966 B2 | 12/2016 | Stein | |
| 9,535,423 B1 | 1/2017 | Debreczeni | |
| 9,555,803 B2 | 1/2017 | Pawlicki | |
| 9,568,915 B1 | 2/2017 | Berntorp | |
| 9,587,952 B1 | 3/2017 | Slusar | |
| 9,720,418 B2 | 8/2017 | Stenneth | |
| 9,723,097 B2 | 8/2017 | Harris | |
| 9,723,099 B2 | 8/2017 | Chen | |
| 9,738,280 B2 | 8/2017 | Rayes | |
| 9,746,550 B2 | 8/2017 | Nath | |
| 10,877,476 B2 | 12/2020 | Liu et al. | |
| 2004/0176936 A1* | 9/2004 | Ohtsu | G09B 19/167 703/8 |
| 2007/0230792 A1 | 10/2007 | Shashua | |
| 2008/0249667 A1 | 10/2008 | Horvitz | |
| 2009/0040054 A1 | 2/2009 | Wang | |
| 2010/0049397 A1 | 2/2010 | Lin | |
| 2010/0226564 A1 | 9/2010 | Marchesotti | |
| 2010/0281361 A1 | 11/2010 | Marchesotti | |
| 2011/0206282 A1 | 8/2011 | Aisaka | |
| 2012/0105639 A1 | 5/2012 | Stein | |
| 2012/0140076 A1 | 6/2012 | Rosenbaum | |
| 2012/0274629 A1 | 11/2012 | Baek | |
| 2014/0145516 A1 | 5/2014 | Hirosawa | |
| 2014/0198184 A1 | 7/2014 | Stein | |
| 2015/0062304 A1 | 3/2015 | Stein | |
| 2015/0353082 A1 | 12/2015 | Lee | |
| 2016/0037064 A1 | 2/2016 | Stein | |
| 2016/0094774 A1 | 3/2016 | Li | |
| 2016/0129907 A1 | 5/2016 | Kim | |
| 2016/0165157 A1 | 6/2016 | Stein | |
| 2016/0210528 A1 | 7/2016 | Duan | |
| 2016/0314224 A1* | 10/2016 | Wei | G05D 1/0088 |
| 2016/0321381 A1 | 11/2016 | English | |
| 2016/0375907 A1 | 12/2016 | Erban | |
| 2017/0109458 A1 | 4/2017 | Micks | |
| 2019/0025841 A1* | 1/2019 | Haynes | G01C 21/3492 |
| 2019/0163181 A1 | 5/2019 | Liu | |
| 2020/0074266 A1* | 3/2020 | Peake | G06T 7/246 |
| 2020/0384998 A1* | 12/2020 | Yang | G05D 1/0088 |
| 2021/0103283 A1 | 4/2021 | Liu et al. | |
| 2021/0286925 A1* | 9/2021 | Wyrwas | G06V 20/56 |
| 2023/0066635 A1* | 3/2023 | Chandrasekaran | B60W 30/146 |

FOREIGN PATENT DOCUMENTS

| | | |
|---|---|---|
| EP | 2448251 A2 | 5/2012 |
| EP | 2463843 A2 | 6/2012 |
| EP | 2463843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/111814 A3 | 7/2014 |
| WO | WO/2014/201324 | 12/2014 |
| WO | WO/2015/083009 | 6/2015 |
| WO | WO/2015/103159 A1 | 7/2015 |
| WO | WO/2015/125022 | 8/2015 |

(56) References Cited

FOREIGN PATENT DOCUMENTS

| WO | WO/2015/186002 A2 | 12/2015 |
|---|---|---|
| WO | WO/2015/186002 A3 | 12/2015 |
| WO | WO/2016/135736 | 9/2016 |
| WO | WO/2017/013875 A1 | 1/2017 |

OTHER PUBLICATIONS

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012,.
Hou, Xiaodi and Zhang, Liqing, "Dynamic Visual Attention: Searching for Coding Length Increments", Advances in Neural Information Processing Systems, vol. 21, pp. 681-688, 2008.
Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.
Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi and Yuille, Alan and Koch, Christof, "A Meta-Theory of Boundary Detection Benchmarks", arXiv preprint arXiv:1302. 5985, pp. 1-4, Feb. 25, 2013.
Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, pp. 1-12, Nov. 8, 2016.
Li, Yanghao and Wang, Naiyan and Liu, Jiaying and Hou, Xiaodi, "Demystifying Neural Style Transfer", arXiv preprint arXiv:1701. 01036, pp. 1-8, Jan. 4, 2017.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, pp. 1-10, Feb. 27, 2017.
Li, Yanghao and Wang, Naiyan and Liu, Jiaying and Hou, Xiaodi, "Factorized Bilinear Models for Image Recognition", arXiv preprint arXiv: 1611.05709, pp. 1-9, Nov. 17, 2016.
Hou, Xiaodi, "Computational Modeling and Psychophysics in Low and Mid-Level Vision", California Institute of Technology, pp. i to xi, 1-114, May 7, 2014.
Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, pp. 12-23, Jan. 1, 2001.
Kyoungho Ahn, Hesham Rakha, "The Effects of Route Choice Decisions on Vehicle Energy Consumption and Emissions", Virginia Tech Transportation Institute, Blacksburg, VA 24061, pp. 1-32, May 1, 2008.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv: 1612.06573v1 [cs.CV] , pp. 1-8, Dec. 20, 2016.
Schroff, Florian, Dmitry Kalenichenko, James Philbin, (Google), "FaceNet: a Unified Embedding for Face Recognition and Clustering", pp. 1-10, CVPR, Jun. 17, 2015.
Dai, Jifeng, Kaiming He, Jian Sun, (Microsoft Research), "Instance-aware Semantic Segmentation via Multi-task Network Cascades", CVPR, pp. 1-10, Dec. 14, 2015.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] , pp. 1-7, Apr. 17, 2015.
Tian Li, "Proposal Free Instance Segmentation Based on Instance-aware Metric", Department of Computer Science, Cranberry-Lemon University, Pittsburgh, PA.,pp. 1-2, 2015.
Mohammad Norouzi, David J. Fleet, Ruslan Salakhutdinov, "Hamming Distance Metric Learning", Departments of Computer Science and Statistics, University of Toronto, pp. 1-9, 2012.
Jain, Suyong Dutt, Grauman, Kristen, "Active Image Segmentation Propagation", in Proceedings of the IEEE Conference on Computer Vision and Pattern Recognition (CVPR), pp. 1-10, Las Vegas, Jun. 2016.
MacAodha, Oisin, Campbell, Neill D.F., Kautz, Jan, Brostow, Gabriel J., "Hierarchical Subquery Evaluation for Active Learning on a Graph", in Proceedings of the IEEE Conference on Computer Vision and Pattern Recognition (CVPR), pp. 1-8, 2014.
Kendall, Alex, Gal, Yarin, "What Uncertainties Do We Need in Bayesian Deep Learning for Computer Vision", arXiv:1703. 04977v1 [cs.CV]pp. 1-11, Mar. 15, 2017.
Wei, Junqing, John M. Dolan, Bakhtiar Litkhouhi, "A Prediction—and Cost Function-Based Algorithm for Robust Autonomous Freeway Driving", 2010 IEEE Intelligent Vehicles Symposium, University of California, San Diego, CA, USA, pp. 512-517, Jun. 21-24, 2010.
Peter Welinder, Steve Branson, Serge Belongie, Pietro Perona, "The Multidimensional Wisdom of Crowds"; http://www.vision.caltech. edu/visipedia/papers/WelinderEtalNIPS10.pdf, pp. 1-9, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611. 09580v1 [cs.CV] pp. 1-7, Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9. pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, pp. 1-16, 2016.
Thanos Athanasiadis, Phivos Mylonas, Yannis Avrithis, and Stefanos Kolllas, "Semantic Image Segmentation and Object Labeling", IEEE Transactions on Circuits and Systems for Video Technology, vol. 17, No. 3, pp. 298-312, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, pp. 1-11,2016.
Adhiraj Somani, Nan Ye, David Hsu, and Wee Sun Lee, "Despot: Online POMDP Planning with Regularization", Department of Computer Science, National University of Singapore, pp. 1-9, 2013.

(56) References Cited

OTHER PUBLICATIONS

Adam Paszke, Abhishek Chaurasia, Sangpil Kim, and Eugenio Culurciello. Enet: a deep neural network architecture for real-time semantic segmentation. CoRR, abs/1606.02147, pp. 1-10, 2016.

Szellski, Richard, "Computer Vision: Algorithms and Applications" http://szeliski.org/Book/, pp. i to xxii, 1-957, 2010.

PCT International Search Report and Written Opinion, International appl. No. PCT/US2018/063393, International filing date, Nov. 30, 2018, document mailing date, Feb. 8, 2019.

Lee, Hwa Sun, "International Preliminary Report on Patentability", International Application No. PCT/US2018/063393, Mailed Jun. 2, 2020, pp. 1-7.

Unknown. Chinese Application No. 201880077255.4, First Office Action Mailed Sep. 28, 2021, pp. 1-11.

Unknown. Chinese Application No. 201880077255.4, First Search Report Mailed Sep. 17, 2021, pp. 1-2.

\* cited by examiner

AUTONOMOUS VEHICLE SIMULATION SYSTEM FOR ANALYZING MOTION PLANNERS

CROSS-REFERENCE TO RELATED APPLICATIONS

This patent application is a continuation of U.S. patent application Ser. No. 17/126,740, filed on Dec. 18, 2020, which is a continuation of U.S. patent application Ser. No. 15/827,452, filed on Nov. 30, 2017, now U.S. Pat. No. 10,877,476. The aforementioned applications are incorporated herein by reference in their entireties.

TECHNICAL FIELD

This patent document pertains generally to tools (systems, apparatuses, methodologies, computer program products, etc.) for autonomous driving simulation systems, trajectory planning, vehicle control systems, and autonomous driving systems, and more particularly, but not by way of limitation, to an autonomous vehicle simulation system for analyzing motion planners.

BACKGROUND

An autonomous vehicle is often configured to follow a trajectory based on a computed driving path generated by a motion planner. However, when variables such as obstacles (e.g., other dynamic vehicles) are present on the driving path, the autonomous vehicle must use its motion planner to modify the computed driving path and perform corresponding control operations so the vehicle may be safely driven by changing the driving path to avoid the obstacles. Motion planners for autonomous vehicles can be very difficult to build and configure. The logic in the motion planner must be able to anticipate, detect, and react to a variety of different driving scenarios, such as the actions of the dynamic vehicles in proximity to the autonomous vehicle. In most cases, it is not feasible and even dangerous to test autonomous vehicle motion planners in real world driving environments. As such, simulators can be used to test autonomous vehicle motion planners. However, to be effective in testing autonomous vehicle motion planners, these simulators must be able to realistically model the behaviors of the simulated dynamic vehicles in proximity to the autonomous vehicle in a variety of different scenarios. Conventional simulators have been unable to overcome the challenges of modeling driving behaviors of the simulated proximate dynamic vehicles to make the behaviors of the simulated dynamic vehicles as similar to real driver behaviors as possible. Moreover, conventional simulators have been unable to achieve a level of efficiency and capacity necessary to provide an acceptable test tool for autonomous vehicle motion planners.

SUMMARY

An autonomous vehicle simulation system for analyzing motion planners is disclosed herein. Specifically, the present disclosure describes an autonomous vehicle simulation system to generate simulated map data and simulated perception data with simulated dynamic vehicles having various driving behaviors to test, evaluate, or otherwise analyze autonomous vehicle motion planning systems, which can be used in real autonomous vehicles in actual driving environments. The simulated dynamic vehicles (also denoted herein as non-player characters or NPC vehicles) generated by the simulation system of various example embodiments described herein can model the vehicle behaviors that would be performed by actual vehicles in the real world, including lane change, overtaking, acceleration behaviors, and the like. The autonomous vehicle simulation system of various example embodiments can generate two dimensional (2D) or three dimensional (3D) simulated map data to test the map processing capabilities of an autonomous vehicle system. The autonomous vehicle simulation system can also generate a 3D simulation of an autonomous vehicle that can receive and process autonomous vehicle control messages from an autonomous vehicle control system just like a real world autonomous vehicle would process the control messages. During the execution of a simulation scenario, the autonomous vehicle simulation system can collect analytics data, vehicle state information, and recorded motion data related to the performance of the autonomous vehicle system with the control module and motion planner therein. The autonomous vehicle simulation system can further enable the playback of the recorded motion data to highlight the analysis of the performance of the control module and motion planner in various driving and traffic scenarios. The autonomous vehicle simulation system can further allow the modification of the motion planner and a restart of the simulation at any point in a test scenario using the recorded motion data. Additionally, the autonomous vehicle simulation system can read a record created from physical experiments and use the record to generate simulated perception data that is the same or equivalent to the physical experiment record. Thus, an autonomous vehicle motion planner can be tested with realistic simulated data from physical experiments.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

An autonomous vehicle simulation system for analyzing motion planners is disclosed herein. Specifically, the present disclosure describes an autonomous vehicle simulation system to generate simulated map data and simulated perception data with simulated dynamic vehicles having various driving behaviors to test, evaluate, or otherwise analyze autonomous vehicle motion planning systems, which can be used in real autonomous vehicles in actual driving environments. The simulated dynamic vehicles (also denoted herein as non-player characters or NPC vehicles) generated by the simulation system of various example embodiments described herein can model the vehicle behaviors that would be performed by actual vehicles in the real world, including lane change, overtaking, acceleration behaviors, and the like. The autonomous vehicle simulation system of various example embodiments can generate two dimensional (2D) or three dimensional (3D) simulated map data to test the map processing capabilities of an autonomous vehicle system. The autonomous vehicle simulation system can also generate a 3D simulation of an autonomous vehicle that can receive and process autonomous vehicle control messages from an autonomous vehicle control system just like a real world autonomous vehicle would process the control messages. During the execution of a simulation scenario, the autonomous vehicle simulation system can collect analytics data, vehicle state information, and recorded motion data related to the performance of the autonomous vehicle system with the control module and motion planner therein. The autonomous vehicle simulation system can further enable the playback of the recorded motion data to highlight the analysis of the performance of the control module and motion planner in various driving and traffic scenarios. The autonomous vehicle simulation system can further allow the modification of the motion planner and a restart of the simulation at any point in a test scenario using the recorded motion data. Additionally, the autonomous vehicle simulation system can read a record created from physical experiments and use the record to generate simulated perception data that is the same or equivalent to the physical experiment record. Thus, an autonomous vehicle motion planner can be tested with realistic simulated data from physical experiments.

Figure 1:
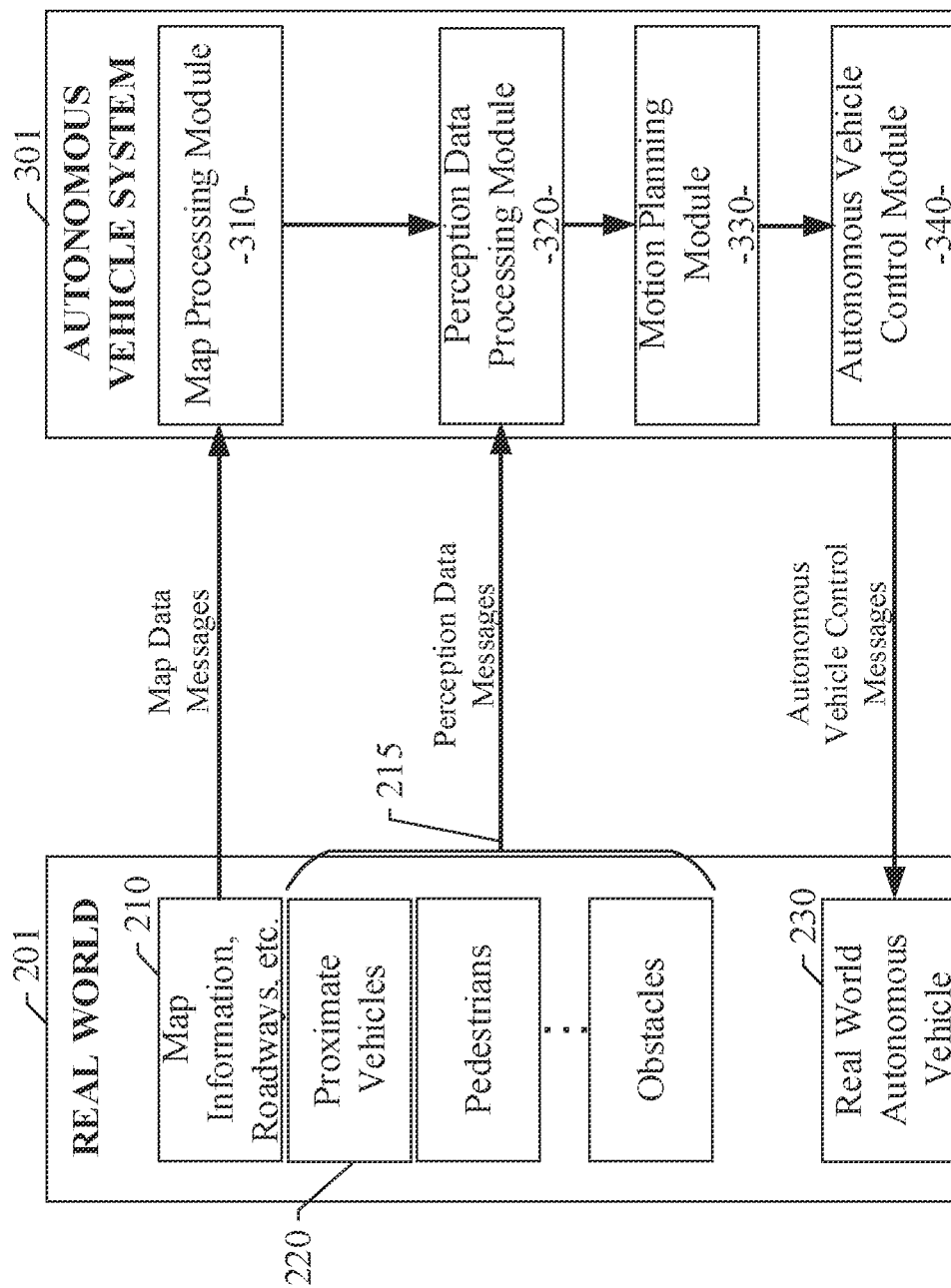
FIG. 1 illustrates the elements of the real world driving environment and the data used and produced by an autonomous vehicle system for controlling an autonomous vehicle in the real world driving environment.

FIG. 1 illustrates the elements of the real world driving environment 201 and the data used and produced by an autonomous vehicle system 301 for controlling an autonomous vehicle 230 in the real world driving environment 201. In other words, FIG. 1 illustrates how an autonomous vehicle system 301 interacts with the real world driving environment 201. As shown, an autonomous vehicle system 301 can use a map processing module 310 to gather map information 210 from the real world driving environment 201, the map information 210 being related to roadways, geographical locations and objects, and other elements in the real world driving environment 201. The map processing module 310 can receive the map information 210 as a set of map data messages that includes digital information and representations of elements mapped in the real world driving environment 201. The various modules and systems disclosed in example embodiments can communicate with configured messages, which improves the flexibility and modularity of the system. The map processing module 310 can use the map information 210 for navigation, motion metrics, orientation, motion planning, user/driver interfaces, and the like.

As also shown in FIG. 1, the autonomous vehicle system 301 can include a perception data processing module 320 to gather perception data 215 from the real world driving environment. The perception data 215 can include data from various vehicle sensors, such as image generating devices (e.g., cameras), light amplification by stimulated emission of radiation (laser) devices, light detection and ranging (LIDAR) devices, global positioning system (GPS) devices, sound navigation and ranging (sonar) devices, radio detection and ranging (radar) devices, other distance measuring systems, and the like. The perception data 215 can include data related to objects detected by the vehicle sensors, the objects including proximate vehicles 220 near the autonomous vehicle, pedestrians, obstacles or other elements detected by the vehicle sensors in the real world driving environment. The perception data 215 is described in more detail below. The perception data processing module 320 can receive the perception data 215 as a set of perception data messages that includes digital information and representations of sensor data captured from the real world environment. In an example embodiment, the perception data processing module 320 can use the perception data 215 for motion planning and navigation, among other uses.

The autonomous vehicle system 301, shown in FIG. 1, can further include a motion planning module 330 and an autonomous vehicle control module 340. The motion planning module 330 can use the map data 210 and the perception data 215 to generate a trajectory and acceleration/speed for the autonomous vehicle that transitions the vehicle toward a desired destination while avoiding obstacles, including other proximate vehicles 220. The autonomous vehicle control module 340 can use the trajectory and acceleration/speed information generated by the motion planning module 330 to generate autonomous vehicle control messages that can manipulate the various control subsystems in a real world autonomous vehicle 230, such as throttle, brake, steering, and the like. The manipulation the various control subsystems in the real world autonomous vehicle 230 can cause the autonomous vehicle 230 to traverse the trajectory with the acceleration/speed as generated by the motion planning module 330. The use of motion planners and control modules in autonomous vehicles is well-known to those of ordinary skill in the art.

Figure 2:
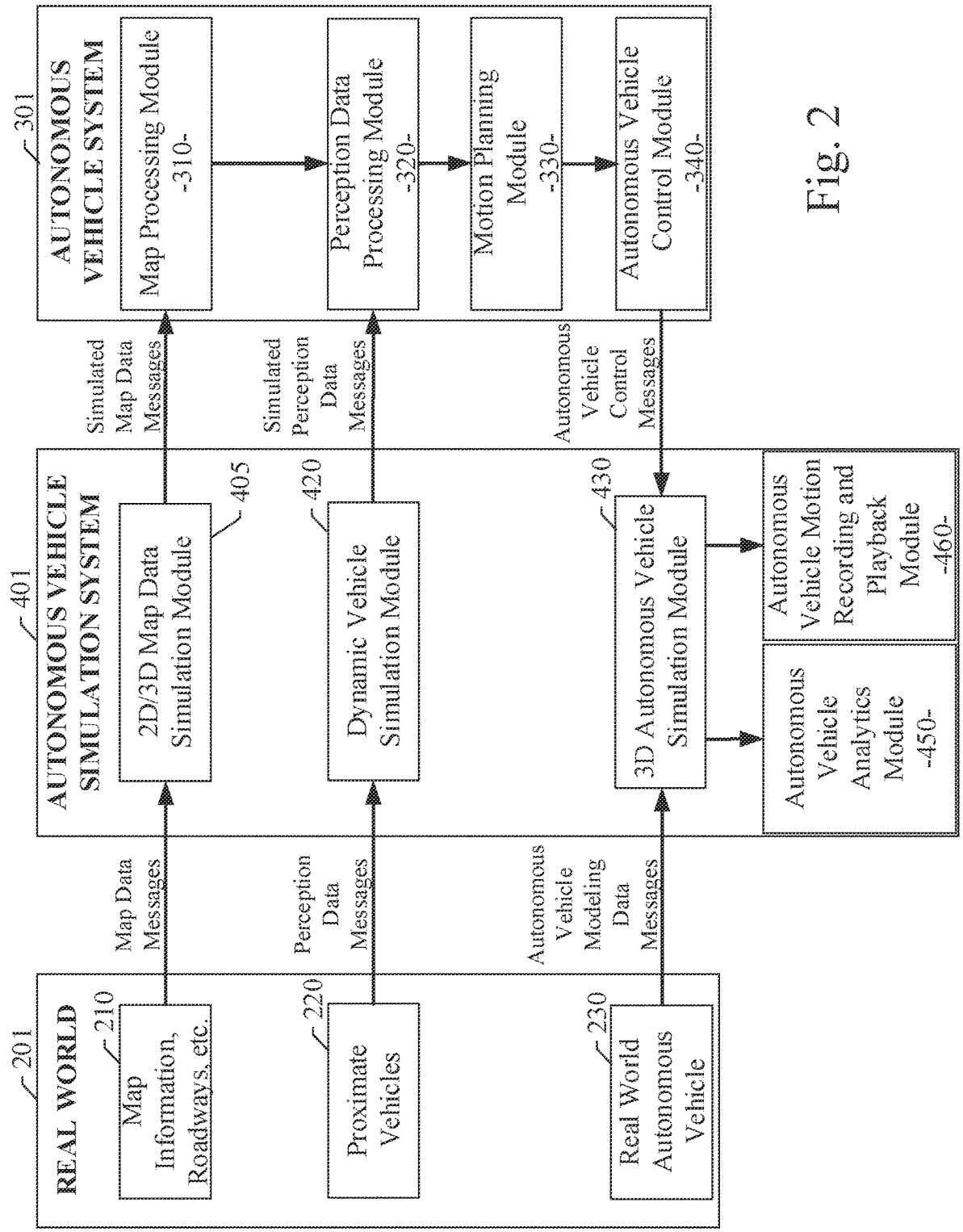
FIG. 2 illustrates the basic components of the autonomous vehicle simulation system of an example embodiment and the interaction of the autonomous vehicle simulation system with the elements of the real world driving environment and the autonomous vehicle system for controlling an autonomous vehicle in the real world driving environment.

FIG. 2 illustrates the basic components of the autonomous vehicle simulation system 401 of an example embodiment and the interaction of the autonomous vehicle simulation system 401 with the elements of the real world driving environment 201 and the autonomous vehicle system 301 for controlling an autonomous vehicle in the real world driving environment 201. As shown in FIG. 2, the autonomous vehicle simulation system 401 of an example embodiment can be interposed between the real world driving environment 201 and the autonomous vehicle system 301 as described above. As a result, the autonomous vehicle system 301 can receive the same types of data from the autonomous vehicle simulation system 401 as otherwise received from the real world driving environment 201. The main difference is that the autonomous vehicle simulation system 401 can produce simulated map data messages and/or simulated perception data messages in place of the real world map data 210 and the real world perception data 215, including the real world proximate vehicle perception data 220. The autonomous vehicle simulation system 401 can also produce simulated proximate dynamic vehicles as part of the simulated perception data messages. The simulated map data messages and/or simulated perception data messages produced by the autonomous vehicle simulation system 401 can be derived from or based on the real world map and perception data received from the real world driving environment 201. The autonomous vehicle simulation system 401 of various example embodiments can generate two dimensional (2D) or three dimensional (3D) simulated map data to test the map processing capabilities of an autonomous vehicle system. Alternatively, the simulated map data messages and/or simulated perception data messages produced by the autonomous vehicle simulation system 401 can be completely simulated and independently generated from the real world driving environment 201. As another alternative, the real world map data 210 and the perception data 215 received from the real world driving environment 201 can be passed directly through the autonomous vehicle simulation system 401 to the autonomous vehicle system 301, making the autonomous vehicle simulation system 401 completely transparent to the real world driving environment 201 and the autonomous vehicle system 301. The autonomous vehicle simulation system 401 can thus be configured to produce simulated map data messages and simulated perception data messages that may include a configured combination of real world data and/or simulated data, including a complete absence of real world data or simulated data. In this manner, the autonomous vehicle simulation system 401 can be highly flexible and generally transparent to the autonomous vehicle system 301 with which it is used. Similarly, the autonomous vehicle system 301 can produce the same types of autonomous vehicle control messages output to the autonomous vehicle simulation system 401 as otherwise output to the real world autonomous vehicle 230 in the real world driving environment 201. These autonomous vehicle control messages generated by the autonomous vehicle system 301 can be received by the autonomous vehicle simulation system 401 and analyzed to determine the validity and appropriateness of the control messages under the circumstances presented by the simulated map data and the simulated perception data. The autonomous vehicle simulation system 401 can generate metrics or analytics data corresponding to the analysis of the autonomous vehicle control messages generated by the autonomous vehicle system 301 and/or the motion planning module 330 therein. The autonomous vehicle simulation system 401 can also generate vehicle motion recording data corresponding to the autonomous vehicle control messages generated by the autonomous vehicle system 301. The vehicle motion recording data can capture the motion and behavior of a simulated autonomous vehicle as controlled using the autonomous vehicle control messages generated by the autonomous vehicle system 301. The vehicle motion recording data can include data corresponding to the map data and perception data synchronized with the associated autonomous vehicle control messages. As a result, the vehicle motion recording data can record a time sequenced set of map data, perception data and corresponding vehicle control messages produced by the autonomous vehicle system 301 and/or the motion planning module 330 therein. Thus, the autonomous vehicle system 301 can be stimulated by the autonomous vehicle simulation system 401 with specifically configured inputs and the resulting output produced by the autonomous vehicle system 301 can be analyzed, recorded, and validated. Moreover, the vehicle motion recording data can be retained and played back to conduct further analysis of the operation of the autonomous vehicle system 301 and the motion planning module or motion planner 330 therein. The autonomous vehicle simulation system 401 can enable the playback of the recorded vehicle motion data to highlight or isolate the analysis of the performance of the vehicle control module 340 and motion planner 330 in various driving and traffic scenarios. The autonomous vehicle simulation system 401 can further allow the modification of the motion planner 330 and a restart of the simulation at any point in a test scenario using the recorded vehicle motion data. Additionally, the autonomous vehicle simulation system 401 can read a record created from physical experiments and use the record to generate simulated perception data that is the same or equivalent to the physical experiment record. Therefore, the autonomous vehicle simulation system 401 of the example embodiments disclosed herein provides a versatile simulation system for testing an autonomous vehicle control system or motion planner. The autonomous vehicle simulation system 401 can directly simulate real world objects to provide a highly realistic environment for an autonomous vehicle system. The autonomous vehicle simulation system 401 can be used for individual subsystem testing (e.g., map, motion planning, control, etc.), or for a more robust integration test that includes all autonomous vehicle subsystems. The autonomous vehicle simulation system 401 can be used for autonomous vehicle control system development and parameters tuning, Additionally, the autonomous vehicle simulation system 401 can be used as a Continuous Integration (CI) system that automatically spots issues or bugs. The details of the structure and operation of the autonomous vehicle simulation system 401 of an example embodiment are disclosed below in connection with FIGS. 3 through 6.

Figure 3:
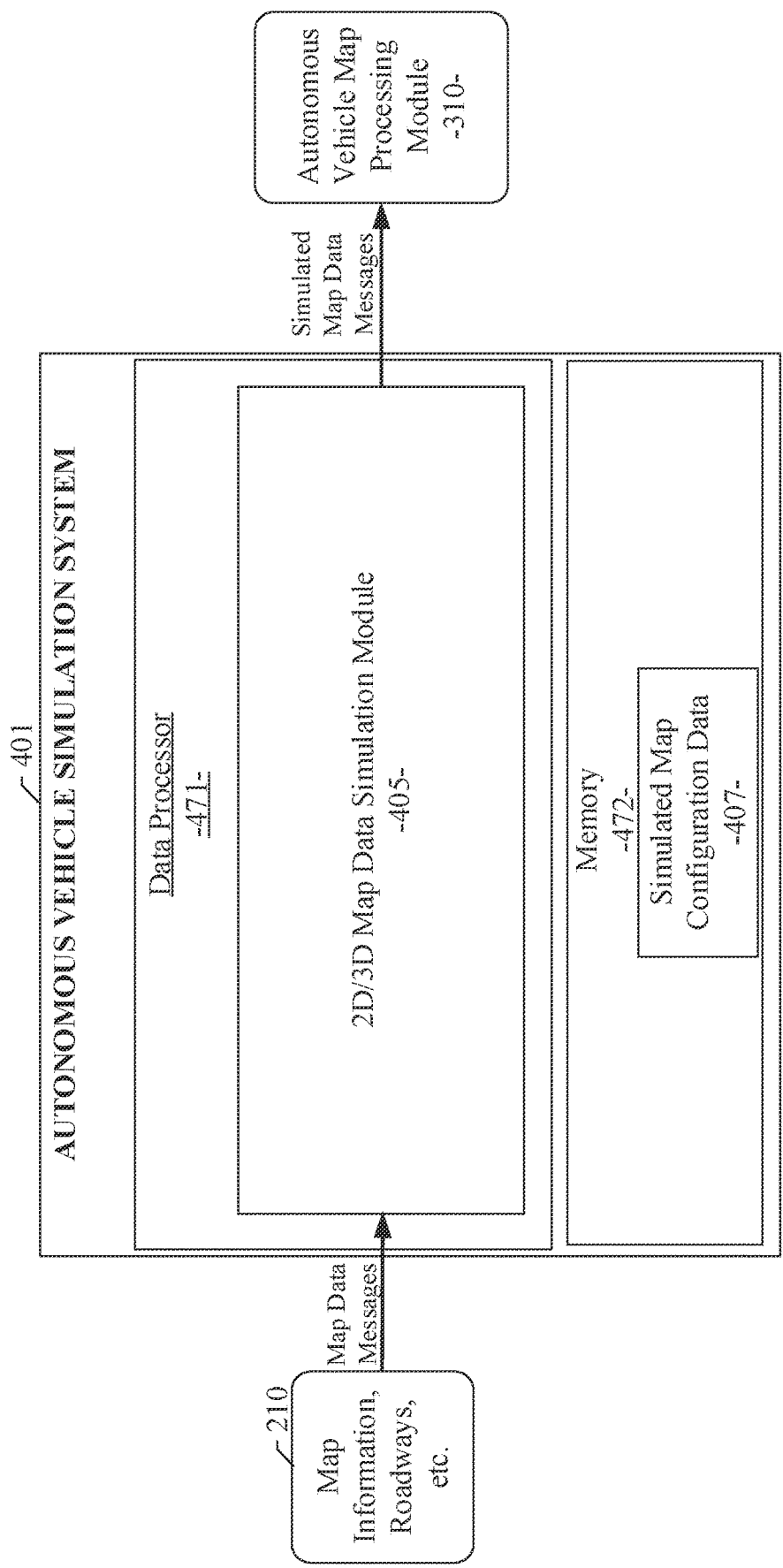
FIG. 3 illustrates the 2D/3D map data simulation module of the autonomous vehicle simulation system of an example embodiment.

FIG. 3 illustrates the 2D/3D map data simulation module 405 of the autonomous vehicle simulation system 401 of an example embodiment. The 2D/3D map data simulation module 405 can be executed by a data processor 471 of the autonomous vehicle simulation system 401. As shown in FIG. 3, the 2D/3D map data simulation module 405 can gather 2D and/or 3D map information 210 from the real world driving environment 201, the map information 210 being related to roadways, geographical locations and objects, and other elements in the real world driving environment. The 2D/3D map data simulation module 405 can receive the map information 210 as a set of map data messages that includes digital information and representations of elements mapped in the real world driving environment 201. The 2D/3D map data simulation module 405 can use the map information 210 for generating simulated map data messages corresponding to the map data that the map processing module 310 of the autonomous vehicle system 301 would use for navigation, motion metrics, orientation, motion planning, user/driver interfaces, and the like. As described above, the simulated map data messages generated by the 2D/3D map data simulation module 405 can include only real world map data, only purely simulated map data, or any combinations or portions of real or simulated map data. Simulated map configuration data 407, stored in a memory system 472 of the autonomous vehicle simulation system 401, can include parameters, data, and instructions used to configure the operation of the 2D/3D map data simulation module 405. The simulated map data messages generated by the 2D/3D map data simulation module 405 can be communicated to the autonomous vehicle map processing module 310 of the autonomous vehicle system 301. The autonomous vehicle system 301 can process the simulated map data messages just as if the autonomous vehicle system 301 had received the map data messages directly from the real world driving environment 201.

Figure 4:
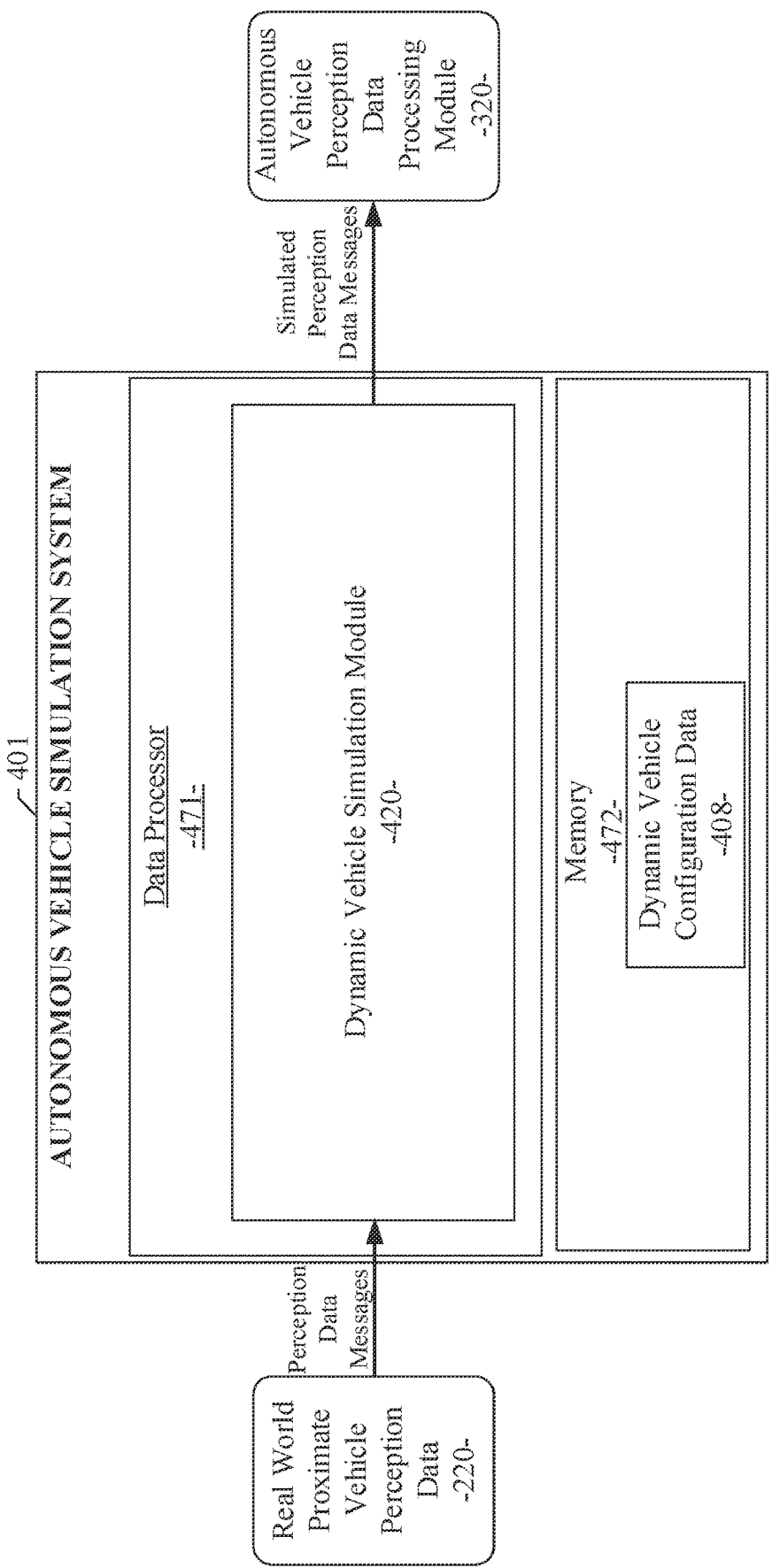
FIG. 4 illustrates the dynamic vehicle simulation module of the autonomous vehicle simulation system of an example embodiment.
Figure 5:
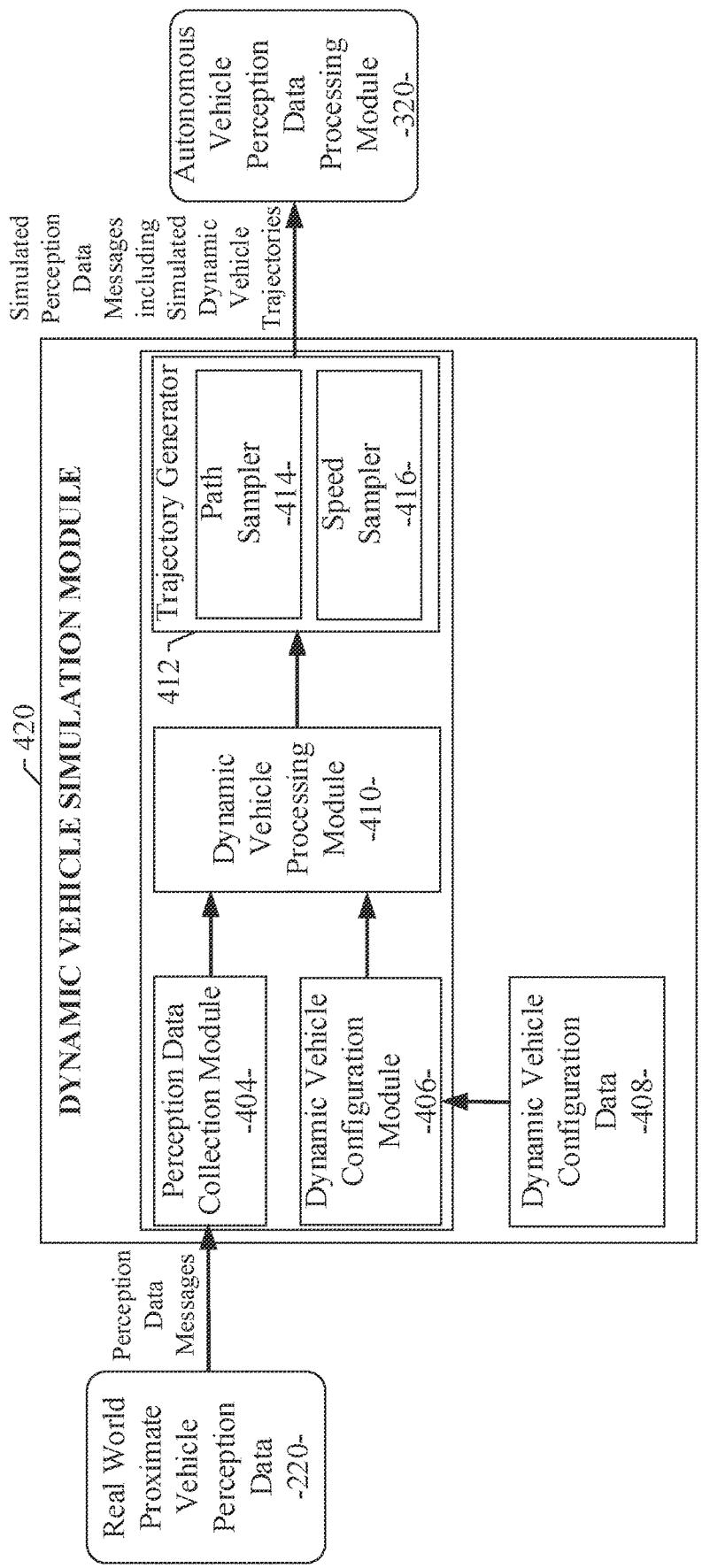
FIG. 5 illustrates the components of the dynamic vehicle simulation module of an example embodiment.

FIG. 4 illustrates the dynamic vehicle simulation module 420 of the autonomous vehicle simulation system 401 of an example embodiment. FIG. 5 illustrates the components of the dynamic vehicle simulation module 420 of an example embodiment. Referring to FIGS. 4 and 5, the diagrams illustrate some of the components of an example embodiment of the autonomous vehicle simulation system 401 and the dynamic vehicle simulation module 420 therein. In particular, the dynamic vehicle simulation module 420 can include a perception data collection module 404. The perception data collection module 404 can be executed by a data processor 471 of the autonomous vehicle simulation system 401. The perception data collection module 404 can include an array of interfaces for receiving perception data associated with the real world driving environment 201 from a plurality of perception information sensing devices or perception data sensors. The perception data sensors may include image generating devices (e.g., cameras), light amplification by stimulated emission of radiation (laser) devices, light detection and ranging (LIDAR) devices, global positioning system (GPS) devices, sound navigation and ranging (sonar) devices, radio detection and ranging (radar) devices, other distance measuring systems, and the like. The perception data gathered by the perception data sensors at various traffic locations can include traffic or vehicle image data, roadway data, environmental data, distance data from LIDAR or radar devices, and other sensor information received from the perception data sensors positioned in the real world driving environment 201 adjacent to particular roadways (e.g., monitored locations) or installed on stationary test vehicles. Additionally, the perception data sensors can include perception data gathering devices installed in or on moving test vehicles being navigated through pre-defined routings in the real world driving environment 201 or location of interest. The the perception data sensors can also include perception data gathering devices installed in or on aerial drones flying above a location of interest. The perception data can include data from which a presence, position, and velocity of neighboring vehicles in the vicinity of or proximate to a host vehicle, autonomous vehicle, or simulated vehicle can be obtained or calculated.

The perception data collection module 404 can collect actual trajectories of vehicles under different scenarios and different driver behaviors. The different scenarios can correspond to different locations, different traffic patterns, different environmental conditions, and the like. The scenarios can be represented, for example, by an occupancy grid, a collection of vehicle states on a map, or a graphical representation, such as a top-down image of one or more areas of interest. The driver behaviors can correspond to a driver's short term driving activity, such as changing lanes to the left or right, overtaking other vehicles, accelerating/decelerating, merging to/from a ramp, making left or right turn at an intersection, making a U-turn, and the like. The driver behaviors can also correspond to a set of driver or vehicle control actions to accomplish the particular short term driving activity.

The image data and other perception data collected by the perception data collection module 404 reflects truly realistic, real-world traffic environment information related to the locations or routings, the scenarios, and the driver behaviors being monitored in the real world driving environment 201. Using the standard capabilities of well-known data collection devices, the gathered traffic and vehicle image data and other perception or sensor data can be wirelessly transferred (or otherwise transferred) to a data processor of a standard computing system, upon which the perception data collection module 404 can be executed. Alternatively, the gathered traffic and vehicle image data and other perception or sensor data can be stored in a memory device at the monitored location or in the test vehicle and transferred later to the data processor of the standard computing system. The traffic and vehicle image data and other perception or sensor data, and the driver behavior data gathered or calculated by the perception data collection module 404 can be used to generate simulated proximate dynamic vehicles for a simulation environment implemented by the autonomous vehicle simulation system 401 as described in more detail below.

Referring again FIGS. 4 and 5, additional components of the autonomous vehicle simulation system 401 are illustrated. As described above, the autonomous vehicle simulation system 401 can gather the perception data collected by the perception data collection module 404. This perception data can be used in a simulation environment, produced by the autonomous vehicle simulation system 401, to create corresponding simulations of proximate dynamic vehicles or object trajectories in the simulation environment. As a result, the example embodiments use the perception data collection module 404 to collect perception data that can be used to infer corresponding human driving behaviors. Then, the example embodiments can use the autonomous vehicle simulation system 401 in the simulation environment to simulate proximate dynamic vehicles with configurable human driving behaviors based in part on the collected perception data.

Referring still FIGS. 4 and 5, the autonomous vehicle simulation system 401 can include a dynamic vehicle configuration module 406, a set of dynamic vehicle configuration data 408, and a dynamic vehicle processing module 410. The dynamic vehicle configuration module 406 and the dynamic vehicle processing module 410 can be executed by a data processor 471 of the autonomous vehicle simulation system 401. The dynamic vehicle configuration data 408 can be stored in a memory device or system 472 of the autonomous vehicle simulation system 401. The dynamic vehicle configuration module 406 can be configured to read portions of the pre-defined data retained as the dynamic vehicle configuration data 408 to obtain pre-defined parameters and executables for each of a plurality of dynamic vehicles being simulated by the dynamic vehicle processing module 410, described in more detail below. The pre-defined parameters and executables for each simulated dynamic vehicle constitute configuration instructions and data defining a specific driving behavior for each of a plurality of dynamic vehicles being simulated. The configuration instructions and data enable the dynamic vehicle processing module 410 to generate a simulation of a particular dynamic vehicle with a specific driving behavior. For example, the configuration instructions and data for a particular dynamic vehicle can cause the dynamic vehicle processing module 410 to generate a simulation of the particular dynamic vehicle with an aggressive driving behavior. In the example, the aggressive driving behavior can correspond to a simulated dynamic vehicle that frequently changes lanes, exhibits steep acceleration and deceleration rates, and travels close to other neighboring vehicles. In contrast, the configuration instructions and data for a particular dynamic vehicle can cause the dynamic vehicle processing module 410 to generate a simulation of the particular dynamic vehicle with a conservative driving behavior. In this example, the conservative driving behavior can correspond to a simulated dynamic vehicle that infrequently changes lanes, exhibits moderate acceleration and deceleration rates, and maintains a greater distance from other neighboring vehicles. It will be apparent to those of ordinary skill in the art in view of the disclosure herein that a variety of other specific driving behaviors can be simulated using the configuration instructions and data defined in the dynamic vehicle configuration data 408 and processed by the dynamic vehicle configuration module 406.

The dynamic vehicle simulation module 420 of an example embodiment, as shown in FIG. 5, can receive the perception data from the perception data collection module 404 and the configuration instructions and data for each dynamic vehicle to be simulated. The received perception data can inform the dynamic vehicle processing module 410 of the environment surrounding the particular dynamic vehicle being simulated. For example, the perception data can include information indicative of the presence, position, and velocity of neighboring vehicles in the vicinity of or proximate to a host vehicle, an autonomous vehicle, or simulated dynamic vehicle. The perception data can also include information indicative of the presence and position of obstacles, the location of the available roadways, and other traffic or environmental information. The configuration instructions and data for each dynamic vehicle to be simulated can inform the dynamic vehicle processing module 410 of the specific configurable driving behaviors to be modeled for the particular dynamic vehicle being simulated. Given the perception data and the configuration instructions and data for each dynamic vehicle being simulated, the dynamic vehicle processing module 410 can generate a proposed or target position, speed, and heading for each particular dynamic vehicle being simulated at specific points in time. The proposed or target position, speed, and heading for each simulated dynamic vehicle can be generated based on the received perception data and the specific configuration instructions and data. In an example embodiment, the dynamic vehicle processing module 410 can use a rule-based process and corresponding data structures to determine and generate the target position, speed, and heading corresponding to the specific behavior of each simulated dynamic vehicle based on the configuration instructions and data corresponding to each simulated dynamic vehicle. In the example embodiment, the specific behavior of a simulated dynamic vehicle, as represented in the rule-based process and corresponding data structures, can be modeled using the target position and direction of the simulated dynamic vehicle along with the target speed of the simulated dynamic vehicle. The target position/direction and target speed of the simulated dynamic vehicle correspond to the position and speed of a vehicle that would be expected given the pre-defined dynamic vehicle configuration data 408 as described above. Thus, the target position/direction and target speed of the simulated dynamic vehicle correspond to the pre-configured behavior for a specific simulated dynamic vehicle. Because the target position/direction and target speed of the simulated dynamic vehicle correspond to the pre-configured behavior, the target position/direction and target speed of each simulated dynamic vehicle is likely to be different among the various simulated dynamic vehicles. For example, a particular simulated dynamic vehicle having a pre-configured behavior corresponding to an aggressive driver may be more likely (higher probability) to have a determined target position/direction and target speed associated with a lane change, passing maneuver, sharp turn, or sudden stop. A different simulated dynamic vehicle having a pre-configured behavior corresponding to a conservative driver may be less likely (lower probability) to have a determined target position/direction and target speed associated with a lane change, passing maneuver, sharp turn, or sudden stop. As a result, a target position/direction and target speed of each simulated dynamic vehicle conforming to the configured driving behavior for each simulated dynamic vehicle can be generated by the dynamic vehicle processing module 410. The target position/direction and target speed can be passed or otherwise communicated to a trajectory generator 412 as shown in FIG. 5.

As illustrated in FIG. 5, the trajectory generator 412 can receive the target position/direction and target speed generated by the dynamic vehicle processing module 410 for each simulated dynamic vehicle as described above. The trajectory generator 412 can generate a trajectory to transition a particular simulated dynamic vehicle from its current position/direction and speed to the target position/direction and target speed as generated by the dynamic vehicle processing module 410. In an example embodiment, the trajectory generator 412 can include a path sampler module 414 and a speed sampler module 416. The path sampler module 414 can generate multiple paths or trajectories from the particular simulated dynamic vehicle's current position to the target position. The multiple trajectories enable a selection of a particular trajectory based on the presence of obstacles or the accommodation of other simulation goals, such as safety, fuel-efficiency, and the like. The speed sampler module 416 can generate multiple acceleration profiles to transition the particular simulated dynamic vehicle from its current speed to the target speed. Again, the multiple acceleration profiles enable a selection of a particular acceleration profile based on the presence of obstacles or the accommodation of other simulation goals, such as safety, fuel-efficiency, and the like. The multiple trajectories and multiple acceleration profiles for each simulated dynamic vehicle can be represented as waypoints each having a corresponding position, speed, acceleration, and time. The waypoints generated by the trajectory generator 412 can represent the movements and behaviors of each simulated dynamic vehicle in the simulation environment. As shown in FIG. 5, the trajectory corresponding to each of a plurality of simulated dynamic vehicles can be provided with the simulated perception data messages as an output from the autonomous vehicle simulation system 401 and an input to an autonomous vehicle perception data processing module 320 of the autonomous vehicle system 301. The autonomous vehicle perception data processing module 320 can interface with a motion planner module 330 of the autonomous vehicle system 301 used to generate a trajectory for an autonomous vehicle based on the environment around the autonomous vehicle and the destination or goals of the autonomous vehicle. The environment around the autonomous vehicle can include the presence, position, heading, and speed of proximate vehicles or other objects near the autonomous vehicle. Given the trajectories corresponding to a plurality of simulated dynamic vehicles as provided by the autonomous vehicle simulation system 401, the motion planner module 330 with the autonomous vehicle perception data processing module 320 can be stimulated to react to the presence and behavior of the simulated dynamic vehicles just as the motion planner 330 would react to the presence and behavior of real vehicles in a real world driving environment 201. In this manner, the autonomous vehicle simulation system 401 can be used to produce trajectories corresponding to a plurality of simulated dynamic vehicles, which can be used to stimulate the motion planner 330 of an autonomous vehicle system 301. The trajectories produced by the motion planner 330 in response to the plurality of simulated dynamic vehicles can be analyzed to determine if the motion planner 330 is producing acceptable output. As described above, the behaviors of the simulated dynamic vehicles generated by the autonomous vehicle simulation system 401 can be configured, modified, and specifically tuned to produce a wide range of driving behaviors, environments, scenarios, and tests to exercise the full capabilities of the autonomous vehicle motion planner 330. As a result of the processing performed by the autonomous vehicle simulation system 401 as described above, data corresponding to simulated driver and vehicle behaviors and corresponding simulated dynamic vehicle trajectories can be produced. Ultimately, the autonomous vehicle simulation system 401 can be used to provide highly configurable simulated traffic trajectory information to a user or for configuration or analysis of a control system of an autonomous vehicle. In particular, the simulated traffic trajectory information can be used to create a virtual world where a control system for an autonomous vehicle can be analyzed, modified, and improved. The virtual world is configured to be identical (as possible) to the real world where vehicles are operated by human drivers. In other words, the simulated traffic trajectory information generated by the autonomous vehicle simulation system 401 is highly useful for configuring and analyzing the control systems of an autonomous vehicle. It will be apparent to those of ordinary skill in the art that the autonomous vehicle simulation system 401 and the simulated traffic trajectory information described and claimed herein can be implemented, configured, processed, and used in a variety of other applications and systems as well.

Referring again to FIGS. 4 and 5, the autonomous vehicle simulation system 401 can be configured to include executable modules developed for execution by a data processor 471 in a computing environment of the autonomous vehicle simulation system 401 and the dynamic vehicle simulation module 420 therein. In the example embodiment, the dynamic vehicle simulation module 420 can be configured to include the plurality of executable modules as described above. A data storage device or memory 472 can also be provided in the autonomous vehicle simulation system 401 of an example embodiment. The memory 472 can be implemented with standard data storage devices (e.g., flash memory, DRAM, SIM cards, or the like) or as cloud storage in a networked server. In an example embodiment, the memory 472 can be used to store the set of dynamic vehicle configuration data 408 as described above. In various example embodiments, the set of dynamic vehicle configuration data 408 can be configured to simulate more than the typical driving behaviors. To simulate an environment that is identical to the real world as much as possible, the dynamic vehicle configuration data 408 can represent typical driving behaviors, which represent average drivers. Additionally, the dynamic vehicle configuration data 408 can also represent atypical driving behaviors. In most cases, the trajectories corresponding to the plurality of simulated dynamic vehicles include typical and atypical driving behaviors. As a result, autonomous vehicle motion planners can be stimulated by the autonomous vehicle simulation system 401 using trajectories generated to correspond to the driving behaviors of polite and impolite drivers as well as patient and impatient drivers in the virtual world. In all, the simulated dynamic vehicles can be configured with data representing driving behaviors that are as varied as possible.

Figure 6:
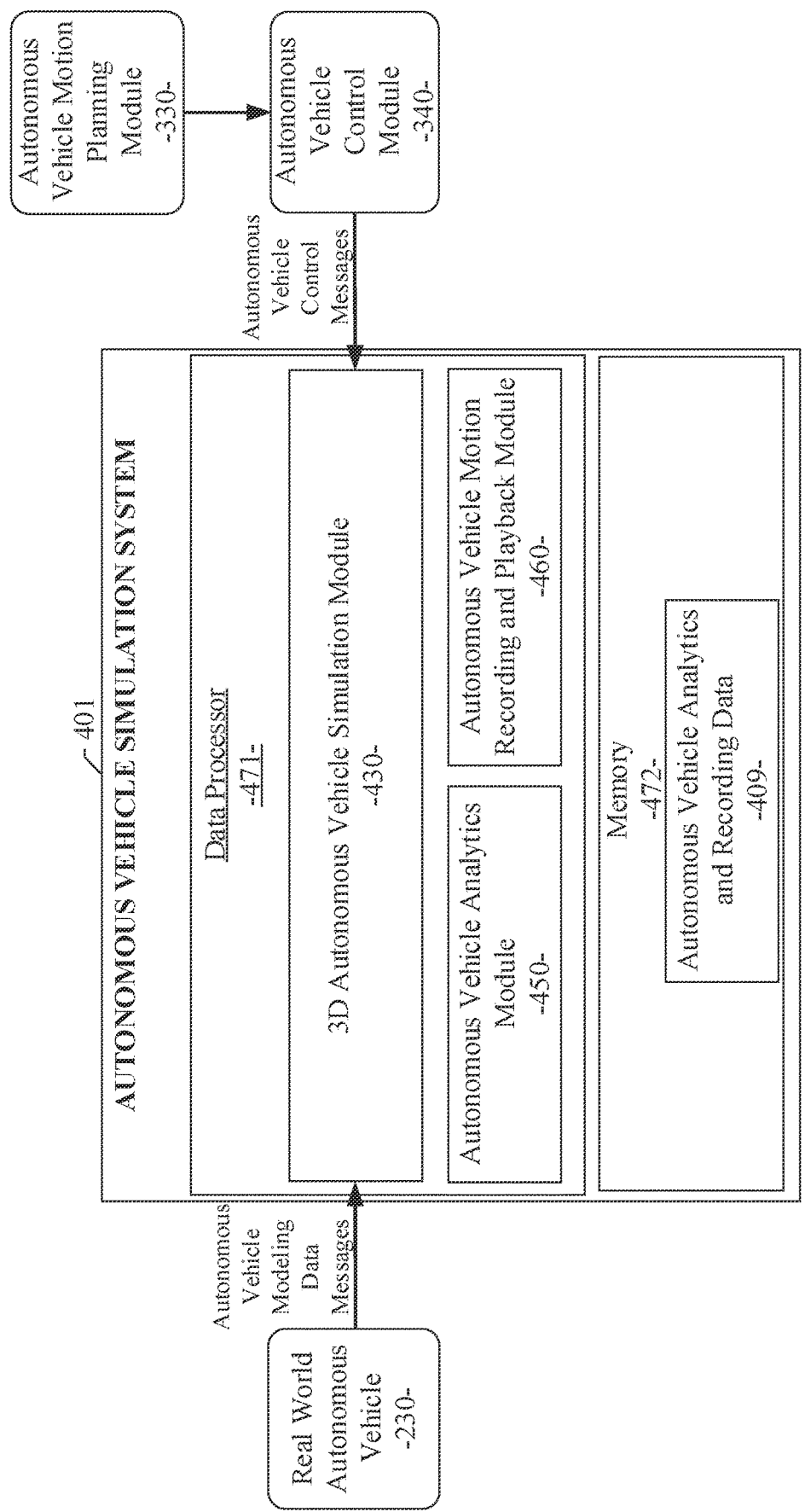
FIG. 6 illustrates the 3D autonomous vehicle simulation module, the autonomous vehicle analytics module, and the autonomous vehicle motion recording and playback module of the autonomous vehicle simulation system of an example embodiment.

FIG. 6 illustrates the 3D autonomous vehicle simulation module 430, the autonomous vehicle analytics module 450, and the autonomous vehicle motion recording and playback module 460 of the autonomous vehicle simulation system 401 of an example embodiment. The 3D autonomous vehicle simulation module 430, the autonomous vehicle analytics module 450, and the autonomous vehicle motion recording and playback module 460 can be executed by a data processor 471 of the autonomous vehicle simulation system 401. As shown in FIGS. 2 and 6, the 3D autonomous vehicle simulation module 430 can model or simulate the operation and behavior of the real world autonomous vehicle 230 based on the autonomous vehicle control messages received from the autonomous vehicle control module 340 of the autonomous vehicle system 301. In an example embodiment, the 3D autonomous vehicle simulation module 430 can include a real-time physics engine to simulate the maneuvers of the real world autonomous vehicle 230 based on the autonomous vehicle control messages. The 3D autonomous vehicle simulation module 430 can also include a lower level control system simulator to simulate the actions and effects of various real world autonomous vehicle 230 subsystems, such as throttle, brake, and steering subsystems. As a result, the 3D autonomous vehicle simulation module 430 can produce data indicative of the movement, behavior, and control system actions that would occur in a real world autonomous vehicle 230 given the autonomous vehicle control messages generated by the autonomous vehicle control module 340. This data can be retained by the autonomous vehicle simulation module 430 and processed by the autonomous vehicle analytics module 450. Additionally, the 3D autonomous vehicle simulation module 430 can obtain vehicle modeling data from the real world autonomous vehicle 230 or other source. The vehicle modeling data can include the type of vehicle, the characteristics of the vehicle control subsystems, the engine performance characteristics, and the like. The vehicle modeling data can be used by the autonomous vehicle simulation module 430 to more accurately and specifically model the particular characteristics and behavior of the specific real world autonomous vehicle 230 being used for the simulation. The vehicle modeling data can be received by the autonomous vehicle simulation module 430 as autonomous vehicle modeling data messages to facilitate the flexibility and modularity of the autonomous vehicle simulation system 401 of an example embodiment.

Referring still to FIG. 6, the autonomous vehicle analytics module 450 can be configured to collect analytics data, vehicle state information, timing and configuration information, and recorded vehicle motion and behavior data related to the performance of the autonomous vehicle system 301 with the control module 340 and motion planner 330 therein. During the execution of a simulation scenario, the autonomous vehicle analytics module 450 can collect the analytics data and vehicle state information and generate additional metrics or analytics data corresponding to the analysis of the autonomous vehicle control messages generated by the autonomous vehicle system 301 and/or the motion planning module 330 therein. The analytics data and vehicle state information can be stored as autonomous vehicle analytics and recording data 409 in a memory device or system 472 of the autonomous vehicle simulation system 401. The autonomous vehicle analytics module 450 can perform an analysis of the received autonomous vehicle control messages to determine the validity and appropriateness of the control messages under the circumstances presented by the simulated map data and the simulated perception data as produced by the autonomous vehicle simulation system 401. In this manner, the autonomous vehicle analytics module 450 can analyze the performance of the autonomous vehicle system 301 under various simulation scenarios and retain analytics data for further analysis by technicians.

Referring still to FIG. 6, the autonomous vehicle motion recording and playback module 460 of the autonomous vehicle simulation system 401 can be configured to obtain and/or generate vehicle motion recording data corresponding to the movement and behavior of the simulated real world autonomous vehicle 230 and the autonomous vehicle control messages output from the autonomous vehicle system 301. The vehicle motion recording data can be stored as autonomous vehicle analytics and recording data 409 in a memory device or system 472 of the autonomous vehicle simulation system 401. The autonomous vehicle motion recording and playback module 460 can further enable the playback of the recorded vehicle motion data to highlight or isolate the analysis of the performance of the control module 340 and motion planner 330 in various simulated driving and traffic scenarios. The autonomous vehicle motion recording and playback module 460 can further allow the modification of the motion planner 330 and a restart of the simulation at any point in a test scenario using the recorded vehicle motion data. The vehicle motion recording data can capture the motion and behavior of the simulated real world autonomous vehicle 230 as controlled using the autonomous vehicle control messages generated by the autonomous vehicle system 301. The vehicle motion recording data can include data corresponding to the map data and perception data synchronized with the associated autonomous vehicle control messages. As a result, the vehicle motion recording data can record a time sequenced set of map data, perception data and corresponding vehicle control messages produced by the autonomous vehicle system 301 and/or the motion planning module 330 therein. Thus, the autonomous vehicle system 301 can be stimulated by the autonomous vehicle simulation system 401 with specifically configured inputs and the resulting output produced by the autonomous vehicle system 301 can be analyzed, recorded, and validated. Moreover, the vehicle motion recording data can be retained and played back to conduct further analysis of the operation of the autonomous vehicle system 301 and the motion planning module or motion planner 330 therein. Thus, the autonomous vehicle simulation system 401 can provide a full simulation environment to test the operation and performance of an autonomous vehicle system 301 and/or the motion planning module 330 and control module 340 therein. The map data and perception data provided as inputs to the autonomous vehicle system 301 can be fully configured and simulated. The outputs produced by the autonomous vehicle system 301 under various simulation scenarios can be retained, analyzed, and replayed to fully exercise, configure, and validate the operation of the autonomous vehicle system 301.

Figure 7:
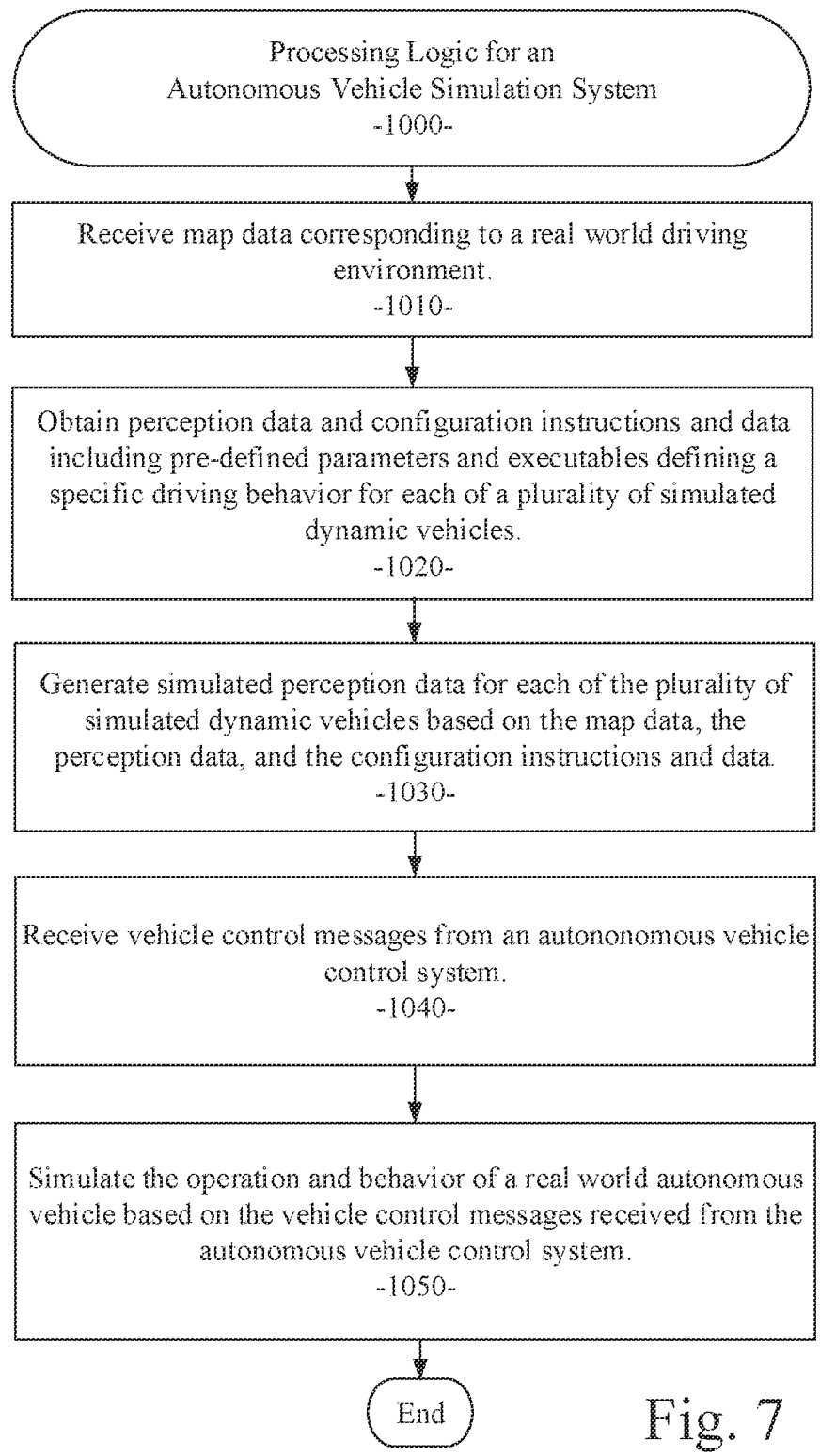
FIG. 7 is a process flow diagram illustrating an example embodiment of an autonomous vehicle simulation system for analyzing motion planners.
Figure 8:
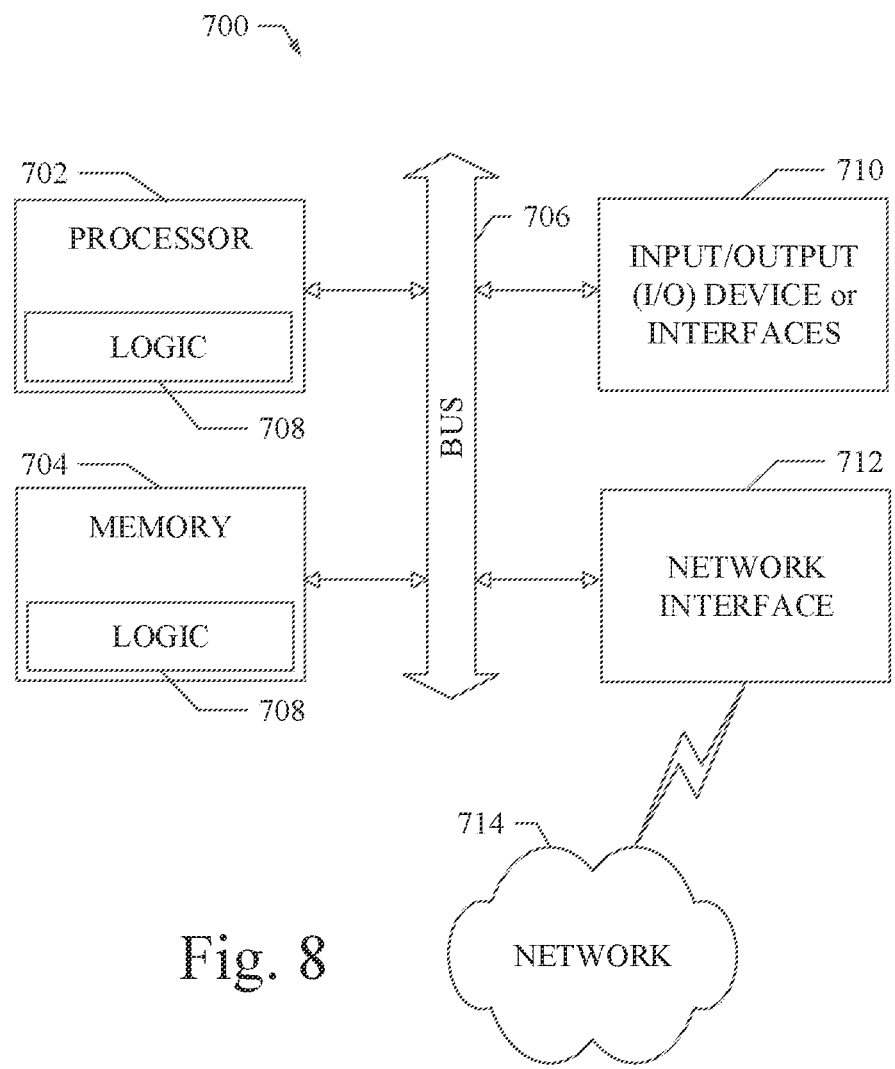
FIG. 8 shows a diagrammatic representation of machine in the example form of a computer system within which a set of instructions when executed may cause the machine to perform any one or more of the methodologies discussed herein.

Referring now to FIG. 7, a flow diagram illustrates an example embodiment of a system and method 1000 for autonomous vehicle simulation. The example embodiment can be configured for: receiving map data corresponding to a real world driving environment (processing block 1010); obtaining perception data and configuration instructions and data including pre-defined parameters and executables defining a specific driving behavior for each of a plurality of simulated dynamic vehicles (processing block 1020); generating simulated perception data for each of the plurality of simulated dynamic vehicles based on the map data, the perception data, and the configuration instructions and data (processing block 1030); receiving vehicle control messages from an autononomous vehicle control system (processing block 1040); and simulating the operation and behavior of a real world autonomous vehicle based on the vehicle control messages received from the autonomous vehicle control system (processing block 1050);

FIG. 8 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700.

As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A vehicle simulation system, comprising:
  a processor configured to:
    perform a simulation in which simulation data indicative of a movement of a vehicle is generated based on a message received from the vehicle and modeling data of the vehicle,
      wherein the message includes a first information with which the vehicle is controlled, and
      wherein the modeling data is received from the vehicle and includes one or more characteristics of the vehicle;
    collect, during the simulation, vehicle motion data related to a simulated motion of the vehicle;
    perform a playback of the vehicle motion data;
    receive perception data that indicates a presence, a position, and a velocity for each of a plurality of vehicles in a vicinity of or proximate to the vehicle; and
    generate, based on the perception data, a target position, a speed, and a heading for each vehicle from the plurality of vehicles and at specific points in time.

2. The vehicle simulation system of claim 1, wherein the perception data includes a second information indicative of another presence and another position of an obstacle.

3. The vehicle simulation system of claim 1, wherein the perception data includes a third information indicative of a location of an available roadway.

4. The vehicle simulation system of claim 1, wherein the perception data includes a fourth information indicative of traffic or environmental information.

5. The vehicle simulation system of claim 1, wherein the plurality of vehicles includes a first vehicle and a second vehicle,
  wherein a first heading is generated for the first vehicle having a first pre-configured behavior associated with an aggressive driver,
  wherein a second heading is generated for the second vehicle having a second pre-configured behavior associated with a conservative driver, and
  wherein a probability of the first heading of the first vehicle being associated with a lane change is greater than that of the second heading of the second vehicle.

6. A method comprising:
  performing a simulation in which simulation data indicative of a movement of a vehicle is generated based on a message received from the vehicle and modeling data of the vehicle,
    wherein the message includes a first information with which the vehicle is controlled, and
    wherein the modeling data is received from the vehicle and includes one or more characteristics of the vehicle;
  collecting, during the simulation, vehicle motion data related to a simulated motion of the vehicle;
  performing a playback of the vehicle motion data;
  receiving perception data that indicates a presence, a position, and a velocity for each of a plurality of vehicles in a vicinity of or proximate to the vehicle; and
  generating, based on the perception data, a target position, a speed, and a heading for each vehicle from the plurality of vehicles and at specific points in time.

7. The method of claim 5, wherein the modeling data of the vehicle includes a type of the vehicle.

8. The method of claim 5, wherein the modeling data of the vehicle includes characteristics of a control system of the vehicle.

9. The method of claim 5, wherein the modeling data of the vehicle includes engine performance characteristics.

10. The method of claim 6, further comprising:
  collecting, during the simulation, analytics data, vehicle state information, and timing and configuration information.

11. The method of claim 6, wherein the first information in the message causes the vehicle to traverse a trajectory with an acceleration or a speed that is generated.

12. The method of claim 6, wherein the movement includes an action or an effect of throttle, brake, or steering applied on the vehicle.

13. The method of claim 6, wherein the vehicle motion data includes a time sequenced set of map data, the perception data and one or more messages produced by one or more systems in the vehicle.

14. A non-transitory machine-useable storage medium embodying instructions which, when executed by a machine, causes the machine to perform a method, comprising:
  performing a simulation in which simulation data indicative of a movement of a vehicle is generated based on a message received from the vehicle and modeling data of the vehicle,
    wherein the message includes a first information with which the vehicle is controlled, and wherein the modeling data is received from the vehicle and includes one or more characteristics of the vehicle;
collecting, during the simulation, vehicle motion data related to a simulated motion of the vehicle;
performing a playback of the vehicle motion data;
receiving perception data that indicates a presence, a position, and a velocity for each of a plurality of vehicles in a vicinity of or proximate to the vehicle; and
generating, based on the perception data, a target position, a speed, and a heading for each vehicle from the plurality of vehicles and at specific points in time.

15. The non-transitory machine-useable storage medium of claim 14, wherein the modeling data of the vehicle includes a type of the vehicle.

16. The non-transitory machine-useable storage medium of claim 14, wherein the modeling data of the vehicle includes characteristics of a control system of the vehicle.

17. The non-transitory machine-useable storage medium of claim 14, wherein the modeling data of the vehicle includes engine performance characteristics.

18. The non-transitory machine-useable storage medium of claim 14, wherein the method further comprises:
collecting, during the simulation, analytics data, vehicle state information, and timing and configuration information.

19. The non-transitory machine-useable storage medium of claim 14, wherein the first information in the message causes the vehicle to traverse a trajectory with an acceleration or a speed of the vehicle that is generated.

20. The non-transitory machine-useable storage medium of claim 14, wherein the perception data includes another information indicative of a location of an available roadway.

* * * * *